United States Patent
Shin et al.

(10) Patent No.: US 9,321,437 B2
(45) Date of Patent: Apr. 26, 2016

(54) MOTOR CONTROL SYSTEM AND METHOD FOR WEAR COMPENSATION OF ELECTROMECHANICAL BRAKE

(71) Applicant: DAEGU GYEONGBUK INSTITUTE OF SCIENCE AND TECHNOLOGY, Daegu (KR)

(72) Inventors: Dong Hwan Shin, Daegu (KR); Tae Sang Park, Daegu (KR); Choong Pyo Jeong, Daegu (KR); Sung Ho Jin, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 21 days.

(21) Appl. No.: 14/541,982

(22) Filed: Nov. 14, 2014

(65) Prior Publication Data
US 2015/0308530 A1    Oct. 29, 2015

(30) Foreign Application Priority Data
Apr. 28, 2014  (KR) .......................... 10-2014-0050718

(51) Int. Cl.
| *F16D 65/70* | (2006.01) |
| *B60T 7/04* | (2006.01) |
| *B60T 13/74* | (2006.01) |
| *F16D 125/36* | (2012.01) |
| *F16D 125/40* | (2012.01) |

(52) U.S. Cl.
CPC .............. B60T 7/042 (2013.01); B60T 13/741 (2013.01); *F16D 2125/36* (2013.01); *F16D 2125/40* (2013.01)

(58) Field of Classification Search
CPC ............ F16D 2125/36; F16D 2125/40; F16D 2066/005; F16D 2066/006; F16D 65/66; F16D 65/70; B60T 7/042; B60T 13/741
See application file for complete search history.

(56) References Cited

U.S. PATENT DOCUMENTS

| 6,279,694 | B1 * | 8/2001 | Bohm ..................... B60T 13/74 188/1.11 E |
| 7,448,701 | B2 * | 11/2008 | Nilsson ............... B60T 8/17636 303/165 |
| 2012/0073910 | A1 * | 3/2012 | Baumgartner .......... F16D 55/38 188/71.5 |
| 2012/0193177 | A1 * | 8/2012 | Goto ..................... B60T 13/741 188/161 |
| 2014/0000990 | A1 * | 1/2014 | Shiraki ................... F16D 65/66 188/71.8 |

* cited by examiner

*Primary Examiner* — Khoi Tran
*Assistant Examiner* — Ryan Rink
(74) *Attorney, Agent, or Firm* — Sughrue Mion, PLLC

(57) ABSTRACT

A motor control system for wear compensation between a disc and a pad in an electromechanical brake is disclosed. The system includes a switching unit configured to select a force control loop when a state of the electronic pedal is an applied state and select a velocity control loop when the state of the electronic pedal is a released state, an angular displacement amount calculation unit configured to calculate an angular displacement amount for reverse rotation of a motor for the wear compensation using a clamping force measured by a clamping force sensor of the force control loop when the velocity control loop is selected, and an angular velocity profile generation unit configured to generate an angular velocity profile having an area of the calculated angular displacement amount, generate an angular velocity command value at every sampling time from the generated angular velocity profile, and apply the generated value to the velocity control loop.

14 Claims, 5 Drawing Sheets

MOTOR CONTROL SYSTEM AND METHOD FOR WEAR COMPENSATION OF ELECTROMECHANICAL BRAKE

CROSS-REFERENCE TO RELATED APPLICATION

This application claims priority to and the benefit of Korean Patent Application No. 10-2014-0050718, filed on Apr. 28, 2014, the disclosure of which is incorporated herein by reference in its entirety.

BACKGROUND

1. Field of the Invention

The present invention relates to a motor control system and method for wear compensation of an electromechanical brake, and more particularly, to a motor control system and method using electronic pedal (E-pedal) information for wear compensation of an electromechanical brake in a braking process of a vehicle.

2. Discussion of Related Art

Research and development for the replacement of an electromechanical part of a traditional hydraulic component due to depletion possibility of petroleum fuel and environmentally-friendly constraints in the automotive sector are being actively conducted.

As a part thereof, brake-by-wire technology using the electromechanical brake with which the existing hydraulic brake is replaced in the automotive brake sector is emerging as the next generation brake technology.

In addition, the brake-by-wire technology using the electromechanical brake has a faster response characteristic than the existing hydraulic brake and provides a shorter brake distance in the same driving condition. Thus, the brake-by-wire technology using the electromechanical brake is expected to contribute to the improvement of vehicle safety.

In a configuration, the existing hydraulic brake is configured to include a hydraulic booster for boosting a pedal force by utilizing a negative pressure of an engine, an oil pipe, and a hydraulic caliper.

A brake system based on the brake-by-wire technology is configured to include an electronic pedal configured to convert the driver's braking intention into an electrical signal, a wire, and an electromechanical brake.

In the case of the hydraulic brake, an oil seal mounted between a hydraulic piston and a cylinder plays a role in automatically constantly adjusting a gap between a disc and a pad regardless of an amount of pad wear.

On the other hand, because there is no oil seal in the electromechanical brake, a function of adjusting a gap between discs needs to be separately implemented regardless of an amount of pad wear.

When the wear compensation is not achieved, the driver is inconvenienced during driving due to a non-linear response characteristic that a clamping force generation time is felt differently with respect to the same pedaling amount in a viewpoint of the driver. When the amount of pad wear is large, the merit of the faster response characteristic of the electromechanical brake is reduced.

In the case of the existing developed electromechanical brake, motor control according to a position control loop scheme for this wear compensation is performed and it is necessary to measure or estimate an amount of wear for the motor control according to the position control loop.

However, it is necessary to mount an expensive contactless displacement sensor capable of directly measuring an amount of wear or an additional mechanism is required when an amount of wear is measured and there is a disadvantage in that accuracy is degraded when the amount of wear is estimated.

SUMMARY OF THE INVENTION

Accordingly, an objective of the present invention is to provide a motor control method capable of automatically adjusting a gap between a pad and a disc through a software processing process of an electronic control unit (ECU) for wear compensation of an electromechanical brake without an expensive displacement sensor or a special mechanism.

According to one aspect of the present invention for achieving the aforementioned objective, there is provided a motor control system for wear compensation between a disc and a pad in an electromechanical brake, the motor control system including: a switching unit configured to select a force control loop for controlling torque of a motor when a state of the electronic pedal is an applied state and select a velocity control loop for controlling a velocity of the motor when the state of the electronic pedal is a released state; an angular displacement amount calculation unit configured to calculate an angular displacement amount for reverse rotation of the motor for the wear compensation based on a clamping force ($F_{measured-ApplyStep}$) measured by a clamping force sensor of the force control loop when the velocity control loop is selected; and an angular velocity profile generation unit configured to generate an angular velocity profile having an area of the calculated angular displacement amount, generate an angular velocity command value at every sampling time from the generated angular velocity profile, and apply the generated angular velocity command value to the velocity control loop.

According to another aspect of the present invention, there is provided a motor control method for wear compensation between a disc and a pad in an electromechanical brake, the motor control method including: selecting a force control loop for controlling torque of a motor when a state of the electronic pedal is an applied state and selecting a velocity control loop for controlling a velocity of the motor when the state of the electronic pedal is a released state; calculating an angular displacement amount for reverse rotation of the motor for the wear compensation based on a clamping force ($F_{measured-ApplyStep}$) measured by a clamping force sensor of the force control loop when the velocity control loop is selected; generating an angular velocity profile having an area of the calculated angular displacement amount, generating an angular velocity command value at every sampling time from the generated angular velocity profile, and applying the generated angular velocity command value to the velocity control loop; and performing control for reducing an error between real angular velocity information acquired from information of an encoder mounted on the motor and the angular velocity command value applied to the velocity control loop through a process of comparing the real angular velocity information to the angular velocity command value.

In the case of the existing developed electromechanical brake, the wear compensation is performed by mounting an expensive displacement sensor capable of directly measuring an amount of wear or applying an additional mechanism for a wear compensation function. In the present invention, an automatic gap adjustment method through a motor control scheme which may be easily implemented on software of an ECU for wear compensation of an electromechanical brake without an expensive displacement sensor or a special mechanism is designed. That is, a pedal state is classified into an applied state and a released state and the wear compensation is designed to be achieved by selecting a motor control scheme suitable for each state through switching.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings.

Figure 1:
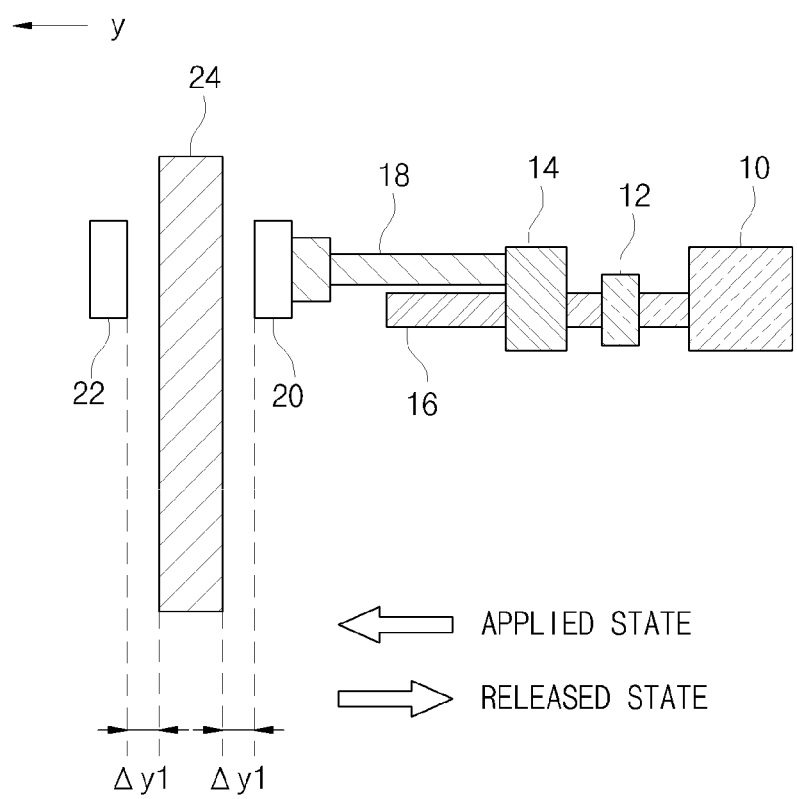
FIG. 1 is a conceptual diagram of an electromechanical brake according to an exemplary embodiment of the present invention.

FIG. 1 is a conceptual diagram schematically illustrating main drive elements of an electromechanical brake according to an exemplary embodiment of the present invention. In order to simplify the drawing, the illustration of drive elements such as a brake caliper and a brake carrier is omitted.

Referring to FIG. 1, the main drive elements of the electromechanical brake according to the exemplary embodiment of the present invention include a motor member 10, a coupling member 12, a nut 14, a ball screw 16, a head 18, pads 20 and 22, and a disc 24.

The motor member 10 includes a motor and a gear head. When a driver generates a required clamping force through an electronic pedal (E-pedal), the motor member 10 generates motor torque corresponding to the generated required clamping force. At this time, a state in which the required clamping force is generated by the E-pedal is defined as an applied state.

This applied state may be defined as a state in which the motor torque of the electromechanical brake is controlled so that the clamping force to be followed is generated while the E-pedal generates the required clamping force (required clamping force command value).

In relation to the applied state, a released state will be described below.

The released state serves as a state opposite the applied state (Apply Step or Zone) and is defined as a state in which the driver separates his/her foot from the E-pedal. The elastic deformation disappears in the released state and the position of the head 18 needs to return to an initial position.

The coupling member 12 connects the motor member 10 and the ball screw 16. The motor torque generated in the applied state is transferred to the ball screw 16 coupled and fixed to the nut 14.

The ball screw 16 and the nut 14 serve as drive elements for converting a rotary motion into a linear motion. The rotary motion of the ball screw 16 is converted into the linear motion of the nut 14. That is, the motor torque is converted into a linear force corresponding to the linear motion and the linear force is transferred to the head 18.

The head 18 transfers the linear force received from the nut 14 to the inner pad 20, and the inner pad 20 generates a clamping force to be applied to the disc 24 using the received linear force through the head 18.

In an operation mechanism of these main drive elements, first, the head 18 pushes the inner pad 20 by $\Delta y1$ which is a gap between the disc 24 and the inner pad 20 in the applied state.

Thereafter, a repulsive force occurring after contact between the inner pad 20 and the disc 24 is transferred to a thrust bearing mounted between the ball screw 16 and the caliper. The outer pad 22 is pulled toward the disc 24 while the caliper is moved back due to the repulsive force. In this case, the ball screw 16 is also moved back as in the caliper and the head additionally moves to the disc by a backward movement amount $\Delta y1$.

Thereafter, the elastic deformations of the caliper and the drive elements are ultimately caused, the required clamping force is generated, and the head 18 is additionally moved by an elastic deformation amount.

As described above, force control of the motor which follows a command of the required clamping force generated by the E-pedal is performed in the applied state.

Because the command of the required clamping force generated by the E-pedal is changed in real time, real-time feedback control is required. That is, the required clamping force varies with a degree to which the E-pedal is pressed (pushed). A force control loop among real-time feedback control loops will be described with reference to FIG. 2.

Figure 2:
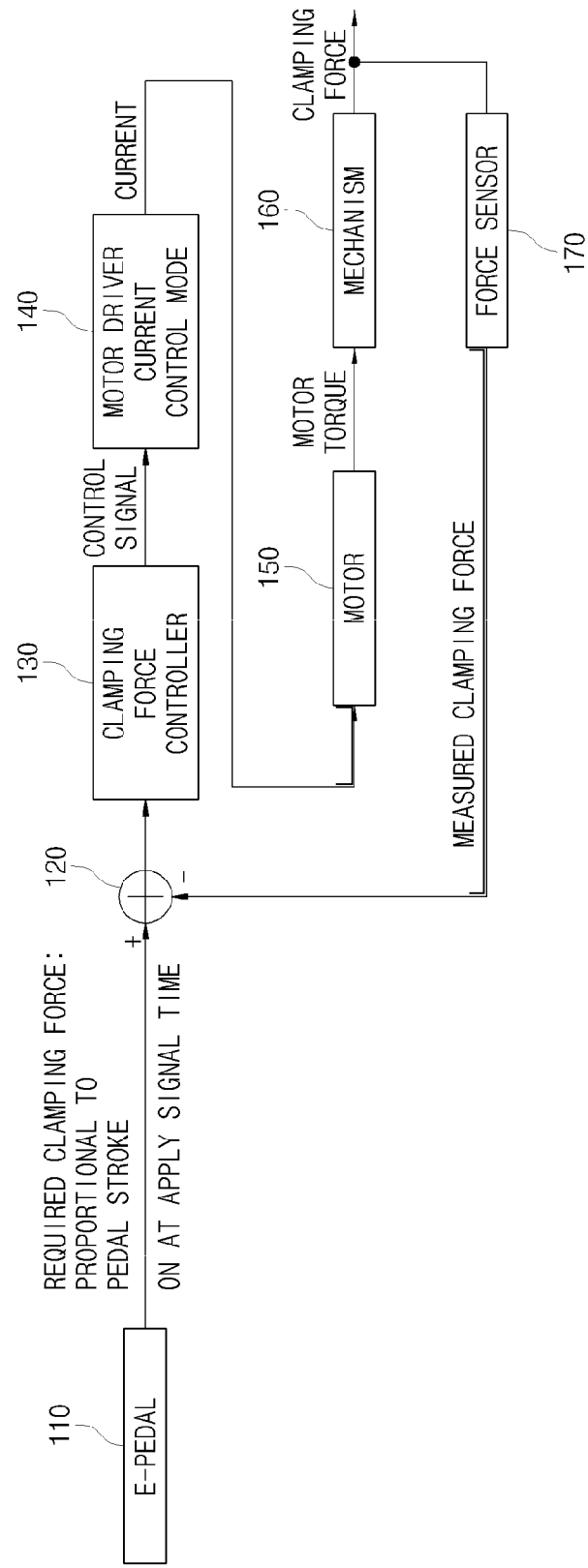
FIG. 2 is a block diagram of the overall system configuration illustrating a force control loop for following a clamping force in an applied state applicable to the present invention.

FIG. 2 is a block diagram of the motor control system illustrating the force control loop for following the clamping force in the applied state applicable to the present invention.

Referring to FIG. 2, the motor control system for the force control loop includes an E-pedal 110, a subtractor 120, a clamping force controller 130, a motor driver 140, a motor 150, a mechanism block 160, and a clamping force sensor 170.

The E-pedal 110 generates a required clamping force corresponding (or proportional) to pedal stroke applied by the driver.

The subtractor 120 receives a feedback of a clamping force measured by the clamping force sensor 170, and outputs a resulting value obtained by subtracting the measured clamping force from the required clamping force from the E-pedal 110.

The clamping force controller 130 outputs a control signal corresponding to the resulting value from the subtractor 120.

The motor driver 140 outputs a drive current corresponding to the control signal.

The motor 150 included in the motor member 10 of FIG. 1 outputs motor torque corresponding to the resulting value obtained by subtracting the measured clamping force from the required clamping force in response to the drive current.

As a block constituted of the main drive elements of the electromechanical brake of FIG. 1, the mechanism block 160 generates the clamping force corresponding to the motor torque from the motor 150. The clamping force sensor 170 outputs the measured clamping force obtained by measuring the clamping force from the mechanism block 160 to the subtractor 120, so that the entire system of FIG. 2 configures the force control loop of the motor which follows the required clamping force.

When the entire system for this force control loop operates in the applied state (or Apply Zone), wear loss occurs in the pad 20 or 22 having lower hardness than the disc, due to the friction between the disc and the pad.

As described above, in the released state, the elastic deformation disappears and the position of the head 18 needs to return to an initial position. However, if the position of the head 18 merely returns to the initial position, a gap between the disc 24 and the pad 20 or 22 becomes greater than the initial value Δy1 due to wear loss of the pad 20 or 22 occurring in the applied state.

Accordingly, in an exemplary embodiment of the present invention, there is provided a wear compensation method of maintaining a constant gap between the disc 24 and the inner pad 20 by determining whether the state of the electronic pedal is the applied state or the released state and calculating an angular displacement amount Δθ for reverse rotation of the motor to rotate the motor by the calculated angular displacement amount Δθ in a reverse direction in the released state. Here, a method of calculating the above-described angular displacement amount Δθ will be described later.

Figure 3:
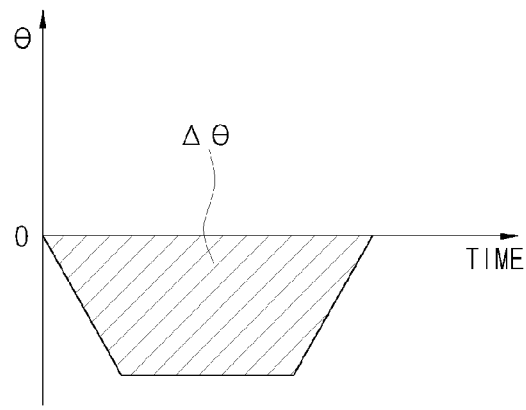
FIG. 3 is a diagram illustrating an angular velocity profile of a motor for reverse rotation of the motor in a released state according to an exemplary embodiment of the present invention.

A concept of an angular velocity profile of the motor is used to rotate the motor in the reverse direction by the given angular displacement amount Δθ and the angular velocity profile of the motor is as illustrated in FIG. 3.

As illustrated in FIG. 3, the angular velocity profile of the motor has a trapezoid-shaped area. This area represents the angular displacement amount Δθ and forms a deceleration zone, a constant velocity zone, and an acceleration zone according to deceleration/acceleration capability of the motor.

The acceleration/deceleration capability of the acceleration/deceleration zone is selected and applied in consideration of components of the motor inertia and the mechanism inertia. Here, the maximum angular velocity is calculated as a rated maximum velocity at which the motor is stably rotatable. As is well known, because there is maximum angular acceleration and maximum angular velocity information, the required times of the acceleration zone and the deceleration zone may be calculated and the required time of the remaining constant velocity zone for satisfying the angular displacement amount Δθ may be calculated.

Figure 4:
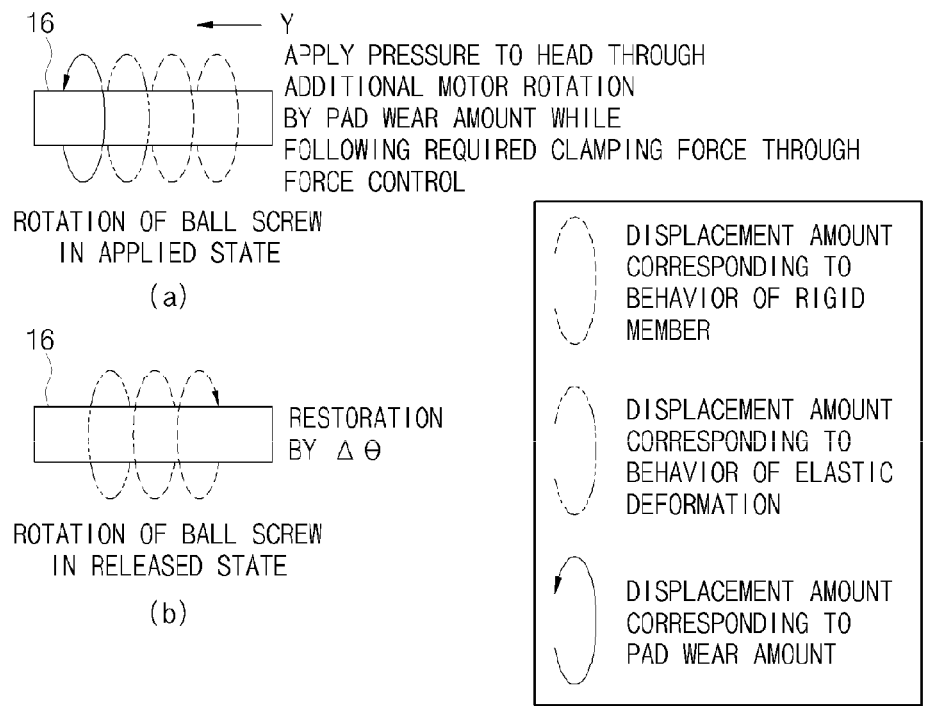
FIG. 4 is a diagram conceptually illustrating a rotation amount of a ball screw in the applied state and a reverse rotation amount of the ball screw in the released state according to an exemplary embodiment of the present invention.

The rotary motion of the ball screw 16 considering the angular displacement amount Δθ calculated in the released state is as illustrated in FIG. 4.

FIG. 4 is a diagram conceptually illustrating a rotation amount of the ball screw in the applied state (or clamping force control zone) and a reverse rotation amount of the ball screw in the released state (or velocity control zone) according to an exemplary embodiment of the present invention. In order to simplify the drawing, the nut 14, which is the drive element illustrated in FIG. 1, is omitted.

In FIG. 4, (a) illustrates the rotary motion of the ball screw 16 in the applied state and (b) illustrates the rotary motion of the ball screw 16 in the released state.

As is well known, the rotary motion of the ball screw 16 is converted into a linear motion of the nut 14 to which the head 18 is connected.

In the applied state, force control of the motor member 10 which follows the required clamping force is performed. In this process, the pad is worn.

In the release state, a constant distance between the pad 20 and the disc 24 is maintained because the nut 14 is moved back through the reverse rotation of the ball screw in consideration of an elastic displacement amount corresponding to a force applied at the last sampling time of the applied state regardless of an amount of wear of the pad 20 or 22.

Consequently, the present invention provides a control scheme of performing wear compensation by identifying the applied state or the released state as the state of the electronic pedal through a switching scheme and selecting a motor control scheme suitable for the identified state. Hereinafter, this control scheme will be described in detail with reference to FIG. 5.

Figure 5:
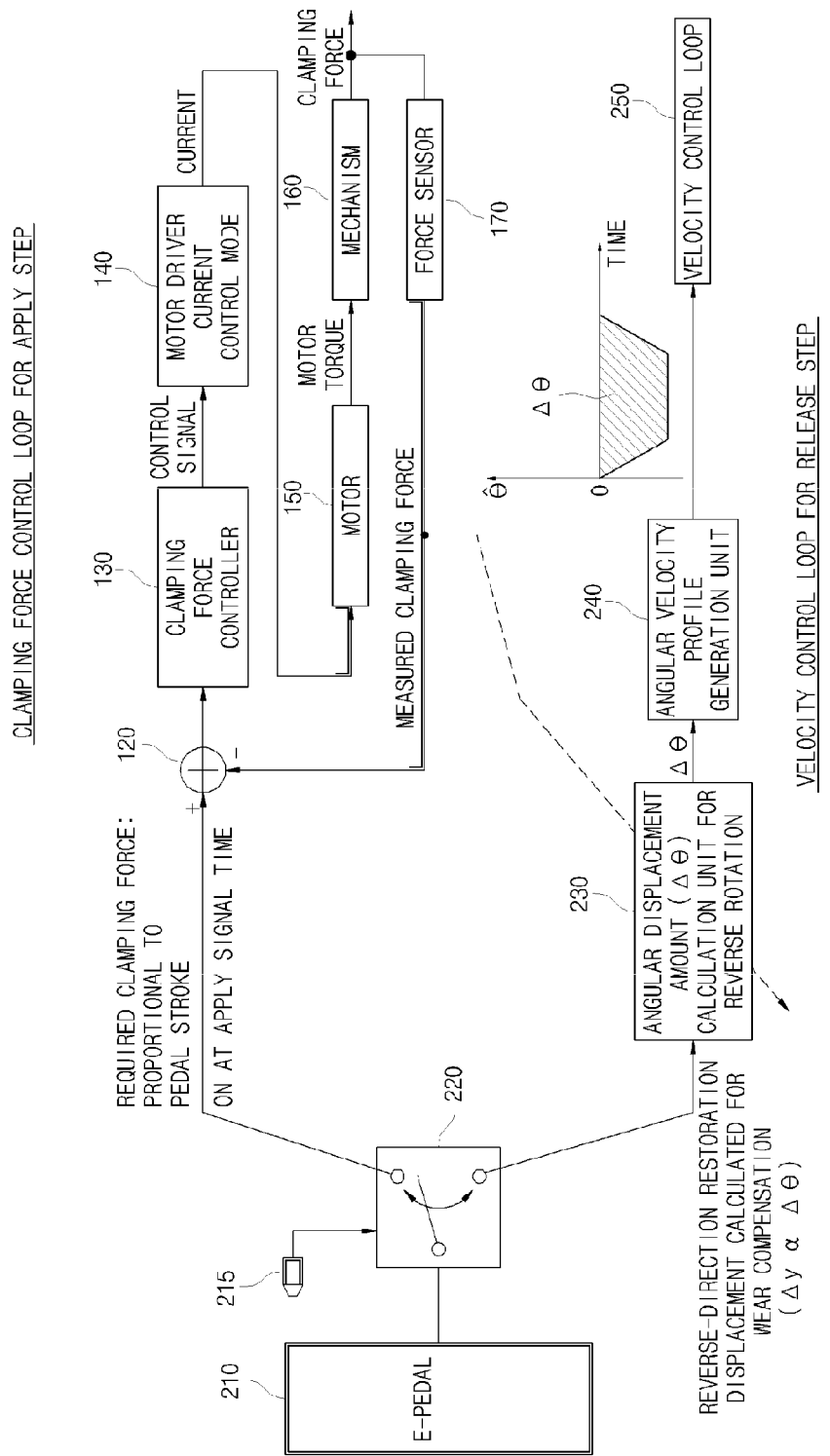
FIG. 5 is a block diagram of a motor control system for performing wear compensation in a different motor control scheme according to an electronic pedal state (applied or released state) according to an exemplary embodiment of the present invention.

FIG. 5 is a block diagram of a motor control system for performing wear compensation in a different motor control scheme according to an E-pedal state (applied or released state) according to an exemplary embodiment of the present invention.

Referring to FIG. 5, the motor control system according to the exemplary embodiment of the present invention includes an E-pedal unit 210, a pedal sensor unit 215, a switching unit 220, an angular displacement amount calculation unit 230, an angular velocity profile generation unit 240, and a velocity control loop 250. Because blocks denoted by the other reference numerals 120, 130, 140, 150, 160, and 170 have been sufficiently described above with reference to FIG. 2, specific descriptions thereof are omitted.

The E-pedal unit 210 generates a required clamping force corresponding to a pedal stroke applied by the driver in the applied state (Apply Step or Zone).

The pedal sensor unit 215 includes a touch sensor mounted on a pedal surface of the E-pedal unit 210 and a stroke sensor mounted inside the E-pedal unit and outputs a pedal signal including a sensing signal sensed by the touch sensor and a sensing signal sensed by the stroke sensor. Here, it may identify whether the state of the E-pedal is the applied state or the released state according to the sensing signal of the touch sensor included in the pedal signal.

The touch sensor mounted on the pedal surface outputs an ON (1) signal while the driver's foot presses the pedal surface. The electromechanical brake performs force control by recognizing that the state of the E-pedal is currently the applied state according to the ON (1) signal. While the force control is performed, a clamping force command corresponding to the pedal stroke is applied to the force control loop.

In contrast, when the driver's foot is separated from the pedal surface, the touch sensor outputs an OFF (0) signal. The electromechanical brake recognizes that the state of the E-pedal is currently the released state according to the above-described OFF (0) signal. A reverse-direction restoration value command using an elastic deformation amount corresponding to an applied force in the applied state immediately before a point time at which the driver's foot is separated from the pedal surface is applied to the velocity control loop 250 regardless of the pedal stroke.

The switching unit 220 performs a switching operation of connecting the E-pedal unit 210 to the force control loop (clamping force control loop for Apply Step) or a switching operation of connecting the E-pedal unit 210 to the velocity control loop (velocity control loop for Release Step) in response to one of the ON (1) signal and the OFF (0) signal of the touch sensor.

The angular displacement amount calculation unit 230 receives the clamping force measured by the clamping force sensor 170 at the last sampling time of the force control loop in the released state, and calculates an angular displacement amount $\Delta\theta_{command\text{-}for\ Release\ Step}$ of the reverse rotation of the motor.

The angular displacement amount $\Delta\theta_{command\text{-}for\ Release\ Step}$ of the reverse rotation of the motor to be utilized in the released state may be represented by the following Equation (1).

$$\Delta\theta_{command\text{-}for\ Release\ Step} = \left(2 \times \Delta y1 + \Delta y_{elastic\text{-}MAX} \times \frac{F_{measured\text{-}ApplyStep}}{F_{MAX}}\right) \times \frac{1}{L} \quad (1)$$

Here, $\Delta y_{elastic\text{-}MAX}$ denotes the maximum elastic deformation amount calculated by the stiffness value designed when the required clamping force is maximum ($F_{MAX}$), L denotes a lead of a ball screw-nut (or a movement distance of the head 18 of FIG. 1), $\Delta y1$ denotes an initial distance between the disc and one pad, and $F_{measured\text{-}ApplyStep}$ denotes the clamping force measured by the clamping force sensor 170 of the force control loop. The reason why $\Delta y1$ is multiplied by 2 in the above Equation (1) is that both a gap between the disc and the inner pad and a gap between the disc and the outer pad are considered (inner pad gap+outer pad gap).

Through Equation (1), it can be seen that the angular displacement amount $\Delta\theta_{command\text{-}for\ Release\ Step}$ of the reverse rotation of the motor is obtained by converting a sum of the initial distance $2*\Delta y1$ between the pad and the disc and a deformation amount corresponding to the clamping force measured at the sampling time of the force control loop of the immediately previously applied state into the angular displacement amount of rotation of the motor. That is, it can be seen that the angular displacement amount $\Delta\theta_{command\text{-}for\ Release\ Step}$ of the reverse rotation of the motor is proportional to the sum of the initial distance $2*\Delta y1$ between the pad and the disc and the deformation amount corresponding to the clamping force measured at the sampling time of the force control loop of the immediately previously applied state and inversely proportional to the lead L of the ball screw-nut.

Consequently, when the E-pedal unit 210 is in the released state, the wear compensation is performed by restoring the rotation amount of the motor by the angular displacement amount $\Delta\theta_{command\text{-}for\ Release\ Step}$ of the reverse rotation of the motor calculated through the above-described Equation (1) based on the clamping force $F_{measured\text{-}ApplyStep}$ measured by the clamping force sensor 170 at the sampling time of the immediately previous force control loop.

On the other hand, a value obtained by multiplying the rotation amount of the motor by the lead L (mm/rev) of the nut-ball screw (denoted by reference numerals 14 and 16 of FIG. 1) is a linear displacement amount $\Delta y$ of the nut (denoted by reference numeral 14 of FIG. 1). According to the clamping force command generated in the applied state, the caliper and the drive elements are linearly deformed in an elastic zone. The deformation amount is found through analysis in a stiffness design step.

Figure 6:
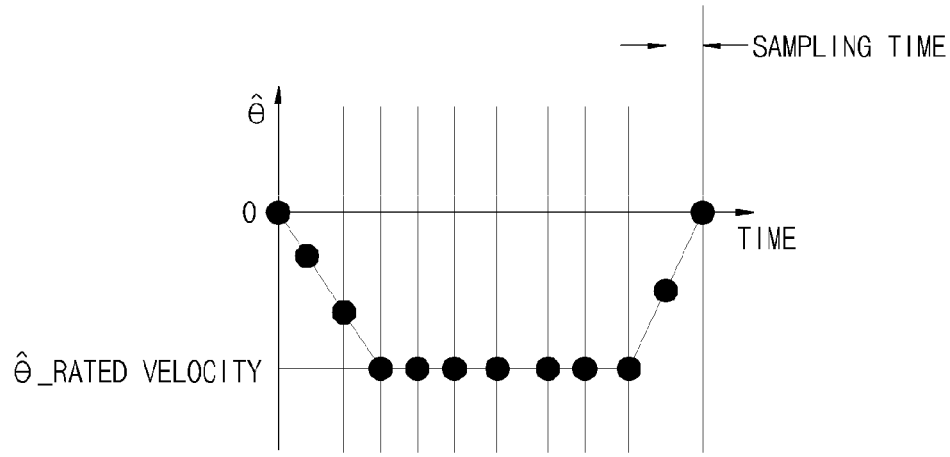
FIG. 6 is an explanatory diagram illustrating an angular velocity command value applied to a velocity control loop based on an angular velocity profile generated by an angular velocity profile generation unit illustrated in FIG. 5.

The angular velocity profile generation unit 240 generates an angular velocity profile as described with reference to FIG. 3 using the angular displacement amount of the reverse rotation calculated by the angular displacement amount calculation unit 230 and generates an angular velocity command value at every sampling time as illustrated in FIG. 6 based on the generated angular velocity profile. The angular velocity command value generated at every sampling time is applied to the velocity control loop 250. A circular point illustrated in FIG. 6 indicates an angular velocity command value applied to the velocity control loop 250.

In the velocity control loop 250, the velocity control of the motor connected to the mechanism is performed through a comparator, a velocity controller, and a motor driver (velocity control mode).

In this velocity control process of the motor, a command value is followed by performing control for reducing an error between real angular velocity information acquired from an encoder mounted on the motor and the angular velocity command value applied to the velocity control loop 250.

Consequently, the velocity control loop 250 follows the angular velocity command value generated by the angular velocity profile generation unit 240, so that control for following the angular displacement amount $\Delta\theta_{command\text{-}for\ Release\ Step}$ (command value of reverse rotation amount of motor) of the reverse rotation of the motor is performed.

Figure 7:
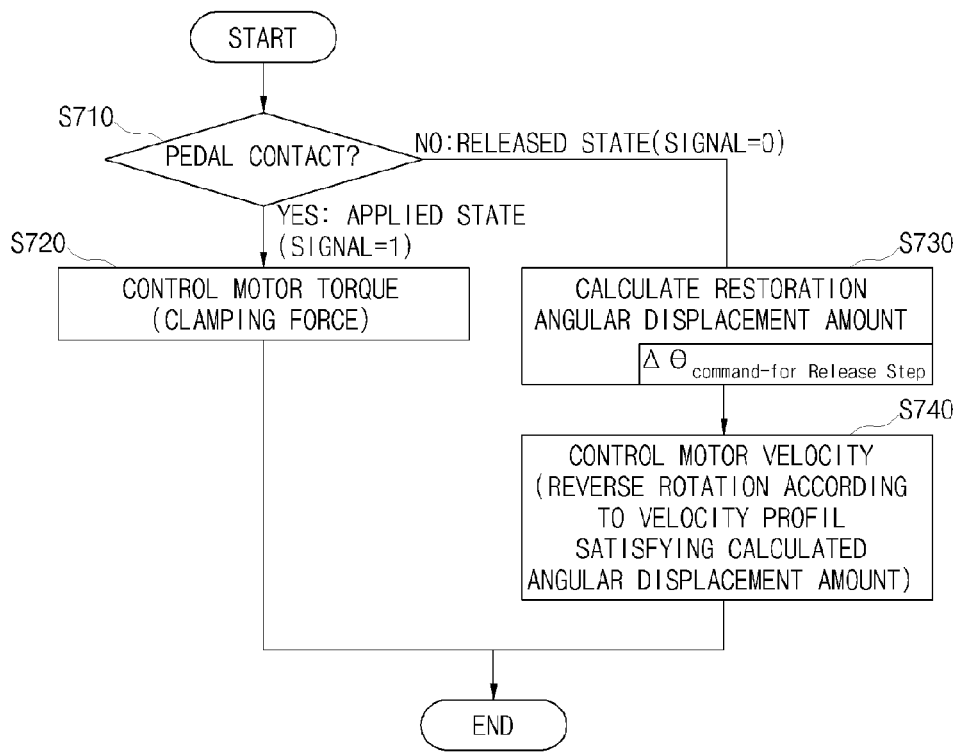
FIG. 7 is a flowchart illustrating a motor control method for wear compensation of an electromechanical brake according to an exemplary embodiment of the present invention.

FIG. 7 is a flowchart illustrating a motor control method for wear compensation of an electromechanical brake according to an exemplary embodiment of the present invention.

Referring to FIG. 7, first, in S710, a process of determining whether the state of the E-pedal is the applied state or the released state according to the sensing operation of the touch sensor mounted on the pedal surface is performed. That is, it is determined whether the driver's foot is in contact with the pedal surface or is separated from the pedal surface.

When the determination result of S710 indicates that the pedal state is the applied state, a process of controlling motor torque according to the force control loop is performed in S720. Because this has been specifically described above with reference to FIG. 2, redundant descriptions thereof are omitted here.

When the determination result of S710 indicates that the pedal state is the released state, a process of calculating the angular displacement amount $\Delta\theta_{command\text{-}for\ Release\ Step}$ for controlling the velocity of the motor according to the velocity control loop is performed in S730. That is, the angular displacement amount $\Delta\theta_{command\text{-}for\ Release\ Step}$ is calculated through the above-described Equation (1) based on the required clamping force $F_{measured\text{-}ApplyStep}$ measured at the immediately previous sampling time through the clamping force sensor (denoted by reference numeral 170 of FIG. 3) within the force control loop.

When the angular displacement amount $\Delta\theta_{command\text{-}for\ Release\ Step}$ is calculated in S730, a process of generating the angular velocity profile having an area of the calculated angular displacement amount and generating an angular velocity command value to be applied to the velocity control loop at every sampling time from the generated angular velocity profile is performed in S740.

In S750, the velocity of the motor is controlled based on the angular velocity command value applied to the velocity control loop. In the process of controlling the velocity of the motor, control for reducing an error between real angular velocity information acquired from information of the encoder mounted on the motor and the angular velocity command value applied to the velocity control loop is performed. That is, the velocity of the motor is controlled for wear compensation through reverse-rotation restoration by a command value of a reverse rotation amount of the motor according to the angular velocity profile which satisfies the calculated angular displacement amount.

Finally, when the pad is replaced, the replacement with a new pad is supported by returning a position of the nut connected to the ball screw to a rightmost initial position through a reset process. Here, the initial position refers to a position at which a distance between the new pad without wear loss and the disc satisfies Δy1. For this, hardware for implementing the reset function for the pad replacement is configured by setting the moved nut as a sensor target and mounting a photo sensor or a proximity sensor at an initial position of a fixed member facing the sensor target.

All the embodiments and conditional examples disclosed throughout the specification are described to help one of ordinary skill in the art understand the principle and concept of the exemplary embodiments, and it will be understood by one of ordinary skill in the art that various changes in form and details may be made therein without departing from the spirit and scope of the exemplary embodiments as defined by the following claims. The exemplary embodiments should be considered in descriptive sense only, and not for purposes of limitation. Therefore, the scope of the exemplary embodiments is defined not by the detailed description of the exemplary embodiments but by the appended claims, and all differences within the scope will be construed as being included in the exemplary embodiments.

What is claimed is:

1. A motor control system for wear compensation between a disc and a pad in an electromechanical brake, the motor control system comprising:
   a switching unit configured to select one of a force control loop for controlling torque of a motor and a velocity control loop for controlling a velocity of the motor according to whether or not there is contact between a foot of a driver and an electronic pedal (E-pedal);
   an angular displacement amount calculation unit configured to calculate an angular displacement amount for reverse rotation of the motor for the wear compensation using a clamping force (Fmeasured-ApplyStep) measured by a clamping force sensor of the force control loop when the velocity control loop is selected; and
   an angular velocity profile generation unit configured to generate an angular velocity profile having an area of the calculated angular displacement amount, generate an angular velocity command value at every sampling time from the generated angular velocity profile, and apply the generated angular velocity command value to the velocity control loop.

2. The motor control system of claim 1, further comprising:
   a touch sensor configured to output a sensing signal indicating whether there is contact between the foot of the driver and a pedal surface of the E-pedal,
   wherein the switching unit selects one of the force control loop and the velocity control loop according to the sensing signal of the touch sensor.

3. The motor control system of claim 2, wherein the switching unit connects the E-pedal to the force control loop so that the force control loop for controlling the torque of the motor to a required clamping force command value corresponding to a pedal stroke amount of the E-pedal is selected according to the sensing signal indicating a state in which the foot of the driver presses the E-pedal.

4. The motor control system of claim 2, wherein the switching unit connects the E-pedal to the force control loop so that the velocity control loop for controlling the velocity of the motor is selected according to the sensing signal indicating a state in which the foot of the driver is separated from the E-pedal.

5. The motor control system of claim 1,
   wherein the electromechanical brake includes a ball screw configured to rotate according to a rotary motion of the motor and a head configured to perform a linear motion according to rotation of the ball screw and clamp the pad to the disc, and
   wherein the angular displacement amount ($\Delta\theta_{command\text{-}for\ Release\ Step}$) calculated by the angular displacement amount calculation unit is proportional to a sum of an initial distance between the disc and the pad and a deformation amount corresponding to the clamping force measured at an immediately previous sampling time of the force control loop.

6. The motor control system of claim 1,
   wherein the electromechanical brake includes a ball screw configured to rotate according to a rotary motion of the motor and a head configured to perform a linear motion according to rotation of the ball screw and clamp the pad to the disc, and
   wherein the angular displacement amount ($\Delta\theta_{command\text{-}for\ Release\ Step}$) calculated by the angular displacement amount calculation unit is inversely proportional to a lead of a ball screw-nut.

7. The motor control system of claim 1, wherein the angular displacement amount calculation unit calculates the angular displacement amount using a product between a maximum elastic deformation amount calculated by a stiffness value designed when a required clamping force applied to the E-pedal is maximum and a resulting value obtained by dividing the clamping force ($F_{measured\text{-}ApplyStep}$) measured in an applied state by the maximum required clamping force.

8. The motor control system of claim 7, wherein the angular displacement amount ($\Delta\theta_{command\text{-}for\ Release\ Step}$) calculated by the angular displacement amount calculation unit is calculated by:

$$\Delta\theta_{command\text{-}for\ Release\ Step} = \left(2 \times \Delta y1 + \Delta y_{elastic\text{-}MAX} \times \frac{F_{measured\text{-}ApplyStep}}{F_{MAX}}\right) \times \frac{1}{L}$$

where $\Delta y_{elastic\text{-}MAX}$ denotes the maximum elastic deformation amount calculated by the stiffness value designed when the required clamping force is maximum ($F_{MAX}$), L denotes a lead of a ball screw-nut, $\Delta y1$ denotes an initial distance between the disc and one pad, and $F_{measured\text{-}ApplyStep}$ denotes the clamping force measured by the clamping force sensor of the force control loop.

9. A motor control method for wear compensation between a disc and a pad in an electromechanical brake, the motor control method comprising:
   selecting one of a force control loop for controlling torque of a motor and a velocity control loop for controlling a velocity of the motor;
   calculating an angular displacement amount for reverse rotation of the motor for the wear compensation using a clamping force ($F_{measured\text{-}ApplyStep}$) measured by a clamping force sensor of the force control loop when the velocity control loop is selected;
   generating an angular velocity profile having an area of the calculated angular displacement amount, generating an angular velocity command value at every sampling time from the generated angular velocity profile, and applying the generated angular velocity command value to the velocity control loop; and performing control for reducing an error between real angular velocity information acquired from information of an encoder mounted on the motor and the angular velocity command value applied to the velocity control loop through a process of comparing the real angular velocity information to the angular velocity command value.

10. The motor control method of claim 9, wherein the selecting includes:

selecting the force control loop for controlling the torque of the motor in a state in which the foot of the driver presses the E-pedal; and selecting the velocity control loop for controlling the velocity of the motor in a state in which the foot of the driver is separated from the E-pedal.

11. The motor control method of claim 9, wherein the electromechanical brake includes a ball screw configured to rotate according to a rotary motion of the motor and a head configured to perform a linear motion according to rotation of the ball screw and clamp the pad to the disc, and wherein the angular displacement amount ($\Delta\theta_{command\text{-}for\ Release\ Step}$) calculated in a process of calculating the angular displacement amount is proportional to a sum of an initial distance ($2*\Delta y1$) between the disc and the pad and a deformation amount corresponding to the clamping force measured at an immediately previous sampling time of the force control loop.

12. The motor control method of claim 9, wherein the electromechanical brake includes a ball screw configured to rotate according to a rotary motion of the motor and a head configured to perform a linear motion according to rotation of the ball screw and clamp the pad to the disc, and wherein the angular displacement amount ($\Delta\theta_{command\text{-}for\ Release\ Step}$) calculated in a process of calculating the angular displacement amount is inversely proportional to a lead of a ball screw-nut.

13. The motor control method of claim 9, wherein the calculating of the angular displacement amount includes:

calculating the angular displacement amount using a product between a maximum elastic deformation amount calculated by a stiffness value designed when a required clamping force applied to the E-pedal is maximum and a resulting value obtained by dividing the clamping force ($F_{measured\text{-}ApplyStep}$) measured in an applied state by the required clamping force applied to the E-pedal.

14. The motor control method of claim 9, wherein the angular displacement amount ($\Delta\theta_{command\text{-}for\ Release\ Step}$) is calculated by:

$$\Delta\theta_{command\text{-}for\ Release\ Step} = \left(2 \times \Delta y1 + \Delta y_{elastic\text{-}MAX} \times \frac{F_{measured\text{-}ApplyStep}}{F_{MAX}}\right) \times \frac{1}{L};$$

where $\Delta\theta_{elastic\text{-}MAX}$ denotes a maximum elastic deformation amount calculated by a stiffness value designed when the required clamping force is maximum ($F_{MAX}$), L denotes a lead of a ball screw-nut, $\Delta y1$ denotes an initial distance between the disc and one pad, and $F_{measured\text{-}ApplyStep}$ denotes the clamping force measured by the clamping force sensor of the force control loop.

* * * * *